United States Patent
Higashi

(10) Patent No.: US 11,334,191 B2
(45) Date of Patent: May 17, 2022

(54) OPERATION METHOD AND DISPLAY DEVICE THAT AVOID OBSTACLES THAT BLOCK DETECTION LIGHT

(71) Applicant: SEIKO EPSON CORPORATION, Tokyo (JP)

(72) Inventor: Keisuke Higashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/003,881

(22) Filed: Aug. 26, 2020

(65) Prior Publication Data

US 2021/0064181 A1 Mar. 4, 2021

(30) Foreign Application Priority Data

Aug. 27, 2019 (JP) .............................. JP2019-154412

(51) Int. Cl.
| | |
|---|---|
| *G06F 3/041* | (2006.01) |
| *G06F 3/042* | (2006.01) |
| *G06F 3/14* | (2006.01) |
| *H04N 9/31* | (2006.01) |
| *G09G 3/36* | (2006.01) |

(52) U.S. Cl.
CPC .......... *G06F 3/0418* (2013.01); *G06F 3/0421* (2013.01); *G06F 3/0425* (2013.01); *G06F 3/14* (2013.01); *G09G 3/36* (2013.01); *H04N 9/31* (2013.01)

(58) Field of Classification Search
CPC .... G06F 3/0418; G06F 3/0421; G06F 3/0425; G06F 3/14; G09G 3/36; H04N 9/31
See application file for complete search history.

(56) References Cited

U.S. PATENT DOCUMENTS

| | | | | |
|---|---|---|---|---|
| 2012/0050194 A1* | 3/2012 | Tanaka | ................... | G06F 3/0481 345/173 |
| 2015/0204659 A1* | 7/2015 | Furukawa | ............. | G06F 3/0428 362/297 |
| 2017/0147142 A1* | 5/2017 | Gu | .......................... | G06F 1/169 |
| 2017/0147153 A1* | 5/2017 | Gu | ............................ | G06T 7/73 |
| 2017/0329459 A1* | 11/2017 | Ishihara | ................ | G06F 3/0425 |
| 2018/0278900 A1* | 9/2018 | Wakimoto | ............ | G06F 3/0418 |
| 2019/0095043 A1* | 3/2019 | Higashi | ................. | G06F 3/0386 |
| 2019/0302594 A1* | 10/2019 | Higashi | .............. | G03B 21/2006 |

FOREIGN PATENT DOCUMENTS

| | | |
|---|---|---|
| JP | 2015-158653 A | 9/2015 |
| JP | 2017-129767 A | 7/2017 |
| JP | 2018-164251 A | 10/2018 |
| JP | 2019-174513 A | 10/2019 |

* cited by examiner

*Primary Examiner* — Chun-Nan Lin
(74) *Attorney, Agent, or Firm* — Oliff PLC

(57) ABSTRACT

An operation method to be executed by a display device including an emission section configured to emit detection light used to detect a pointing body configured to point a display surface along the display surface includes the steps of determining whether an obstacle blocking at least a part of the detection light exists or not based on first imaging data generated by imaging the display surface, and moving, when determining that the obstacle exists, the emission section to thereby make a distance between the display surface and the emission section in a normal direction of the display surface longer than a distance between the display surface and the emission section in the normal direction at a moment of a determination that the obstacle exists.

6 Claims, 8 Drawing Sheets

OPERATION METHOD AND DISPLAY DEVICE THAT AVOID OBSTACLES THAT BLOCK DETECTION LIGHT

The present application is based on, and claims priority from JP Application Serial Number 2019-154412, filed Aug. 27, 2019, the disclosure of which is hereby incorporated by reference herein in its entirety.

BACKGROUND

1. Technical Field

The present disclosure relates to an operation method and a display device.

2. Related Art

In JP-A-2018-164251 (Document 1), there is described a display device which detects reflected light reflected by a pointing body such as a finger out of light having a planar shape emitted along a display surface, and then identifies a position of the pointing body based on the detection result of the reflected light.

The display device described in Document 1 becomes difficult to detect the pointing body when there exists an obstacle which blocks the light having the planar shape.

SUMMARY

An operation method according to an aspect of the present disclosure is an operation method to be executed by a display device including an emission section configured to emit detection light used to detect a pointing body configured to point a display surface along the display surface, the operation method including the steps of (i) determining whether an obstacle blocking at least a part of the detection light exists or not based on first imaging data generated by imaging the display surface, and (ii) moving, when the obstacle is determined to exist in the step (i), the emission section to thereby make a distance between the display surface and the emission section in a normal direction of the display surface longer than a distance between the display surface and the emission section in the normal direction at a moment of a determination that the obstacle exists.

An operation method according to another aspect of the present disclosure is an operation method to be executed by a display device including an emission section configured to emit detection light used to detect a pointing body configured to point a display surface along the display surface, the operation method including the steps of (a) determining whether an obstacle blocking at least a part of the detection light exists or not based on fourth imaging data generated by imaging the display surface, (b) changing, when the obstacle is determined to exist based on the fourth imaging data in the step (a), the direction of the detection light to a direction in which the detection light gets away from the display surface in a normal direction of the display surface, (c) determining whether the obstacle exists or not once again based on fifth imaging data generated by imaging the display surface after the direction of the detection light is changed in the step (b), and (d) moving, when the obstacle is determined to exist in the step (c) based on the fifth imaging data, the emission section to thereby make a distance between the display surface and the emission section in the normal direction of the display surface longer than a distance between the display surface and the emission section in the normal direction at a moment of a determination that the obstacle exists.

A display device according to an aspect of the present disclosure includes an emission section configured to emit detection light used to detect a pointing body configured to point a display surface along the display surface, a moving section configured to move the emission section, a determination section configured to determine whether an obstacle blocking at least a part of the detection light exists or not based on first imaging data generated by imaging the display surface, and an operation control section configured to control, when the determination section determines that the obstacle exists, the moving section to thereby make a distance between the display surface and the emission section in a normal direction of the display surface longer than a distance between the display surface and the emission section in the normal direction at a moment of a determination that the obstacle exists.

DESCRIPTION OF AN EXEMPLARY EMBODIMENT

A: First Embodiment

A1: Outline of Display Device 1

Figure 1:
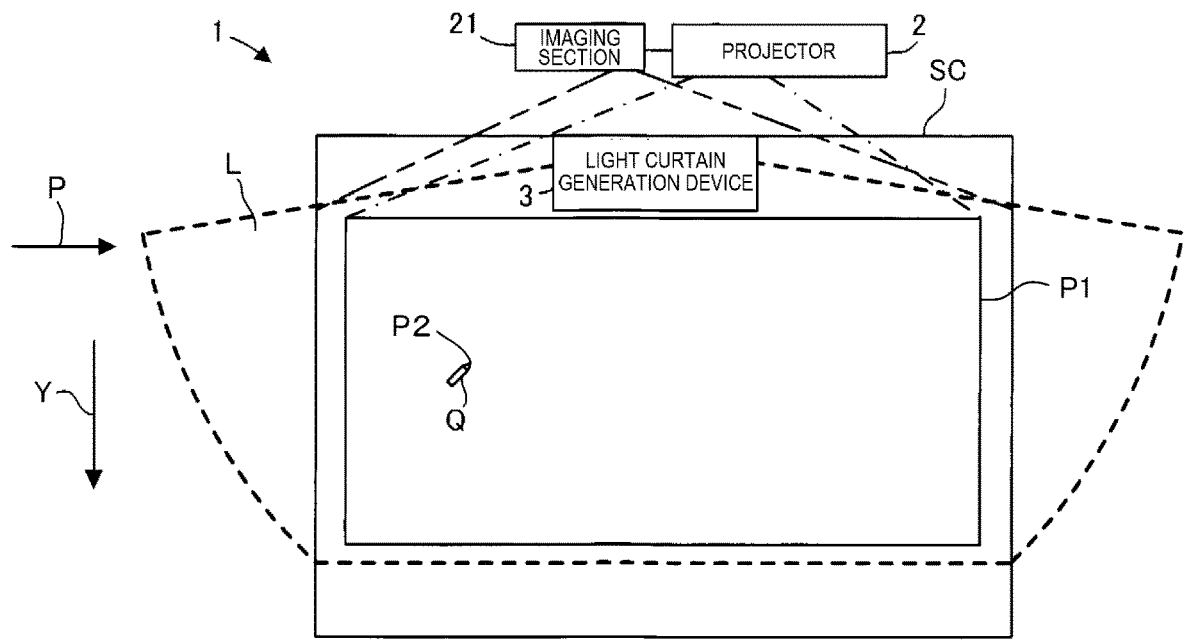
FIG. 1 is a diagram schematically showing a display device according to a first embodiment.
Figure 2:
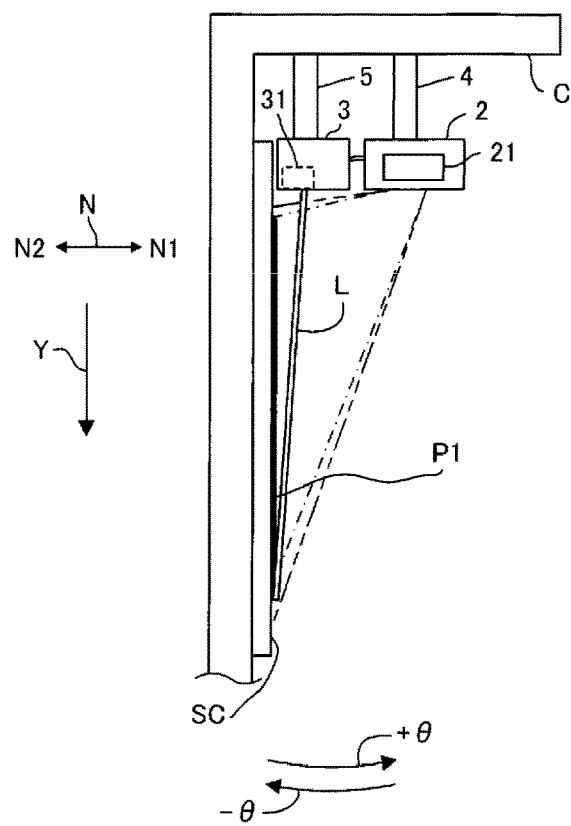
FIG. 2 is a side view of the display device viewed from a direction of the arrow shown in FIG. 1.

FIG. 1 is a diagram schematically showing a display device 1 according to a first embodiment. FIG. 2 is a side view of the display device 1 viewed from a direction of the arrow P shown in FIG. 1.

The display device 1 includes a projector 2, a light curtain generation device 3, and an imaging section 21. The imaging section 21 performs communication with the projector 2 with wire or wirelessly. Further, there can be adopted a configuration in which the imaging section 21 is included in the projector 2.

The projector 2 is installed on a ceiling C via a first support section 4. The projector 2 can also be installed in a part of the wall instead of the ceiling C. The projector 2 projects a projection image P1 on a screen SC to thereby display the projection image P1 on the screen SC.

Hereinafter, as shown in FIG. 2, one direction along a normal line N of the screen SC is referred to as an N1 direction, and an opposite direction to the N1 direction is referred to as an N2 direction. The N1 direction is an example of the normal direction of the screen SC. The screen SC is an example of a display surface. The display surface is not limited to the screen SC, but can also be a part of the wall or a door, for example. When the screen SC is disposed so as to stand vertically, the vertical direction is defined as a Y direction.

The light curtain generation device 3 is installed on the ceiling C via a second support section 5. The light curtain generation device 3 can be installed in a part of the wall instead of the ceiling C. Further, the light curtain generation device 3 can be installed in a part of the screen SC.

The light curtain generation device 3 emits light L having the planar shape so as to pass on the screen SC. Here, the sentence that the light L having the planar shape passes on the screen SC means that the light L having the planar shape at least passes on a projection area or an assumed projection area for the projection image P1 in the screen SC. Therefore, the sentence that the light L having the planar shape passes on the screen SC includes, for example, the fact that the light L having the planar shape proceeds along the screen SC, and the fact that a step-like part of the screen SC is irradiated with the light L having the planar shape after the light L having the planar shape passes on the projection image P1 on the screen SC.

The light L is used for detecting a pointing position P2 on the projection image P1 pointed by the pointing body Q. For example, the pointing body Q is a finger of the user, a rod, or a pen.

The light L is not limited to the light having the planar shape, but can also be light having another shape. Hereinafter, the light L is referred to as a "light curtain." The light curtain L is light in an infrared wavelength band. In the present embodiment, the light curtain L proceeds along the screen SC, and covers an area where the projection image P1 is projected in the screen SC. The light curtain L is the light shaped like a layer, and is set so as to be separated in a normal direction at a distance of several millimeters from the area of the screen SC on which the projection image P1 is projected. In order to improve the detection accuracy of the pointing position P2, the light curtain L is set so as to decrease the distance from the area of the screen SC on which the projection image P1 is projected. However, when making the distance too short, false detection is incurred depending on the surface state and so on of the screen SC.

When the light curtain L is emitted in a downward direction from an upper part of the screen SC, the screen SC is not required to be irradiated with the light curtain L, or it is possible to irradiate a place lower than the projection image P1 with the light curtain L in the screen SC.

The imaging section 21 is a camera provided, for example, with an optical system such as a lens, and an imaging element for converting the light collected by the optical system into an electric signal. The imaging element is a CCD (Charge Coupled Device) image sensor for receiving the light in, for example, an infrared region or a visible light region. The imaging element is not limited to the CCD image sensor, but can also be a CMOS (Complementary Metal Oxide Semiconductor) image sensor for receiving the light in, for example, the infrared region or the visible light region. To the imaging section 21, there is attached an infrared filter in order to receive reflected light of the light curtain L by an object such as a pointing body Q.

The imaging section 21 takes an image of the screen SC to thereby generate imaging data. When a part of the light curtain L is reflected by the object such as the pointing body Q, the imaging data represents the reflected light of the light curtain L by the object such as the pointing body Q. The imaging section 21 outputs the imaging data to the projector 2.

The projector 2 detects a reflection position of the light curtain L by the object such as the pointing body Q using the imaging data. The reflection position is used as, for example, the pointing position P2 by the pointing body Q. The projector 2 changes the projection image P1, or projects an image representing a trajectory of the pointing position P2 on the screen SC in accordance with the pointing position P2 by the pointing body Q.

A2: When Obstacle D Exists

Figure 3:
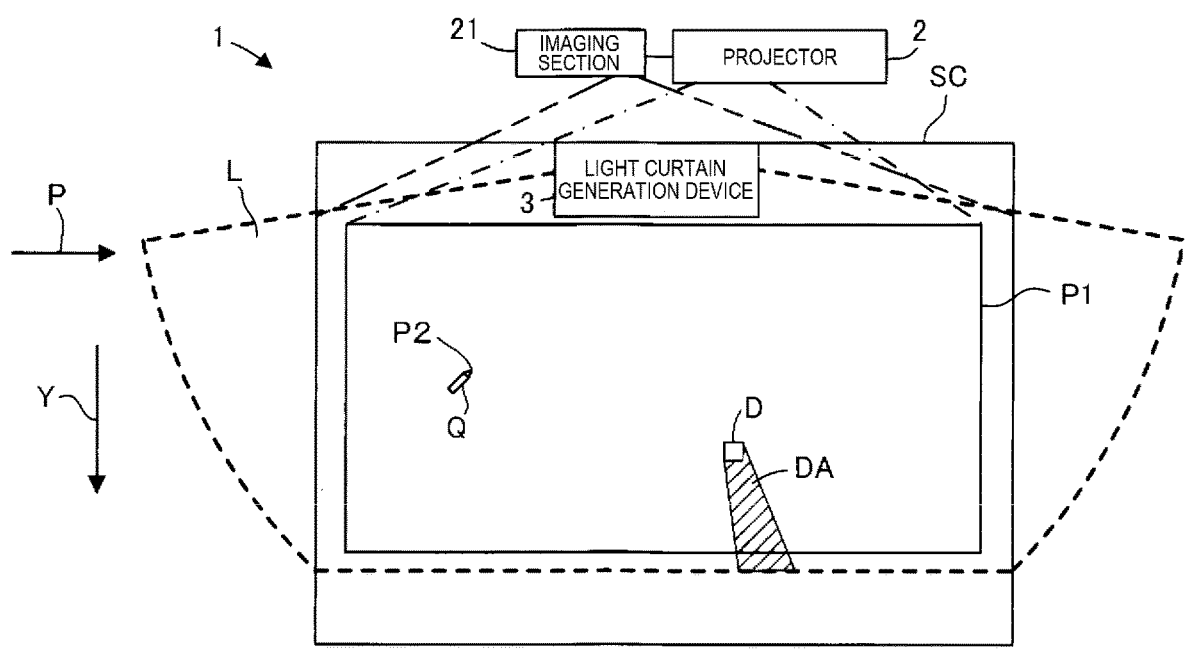
FIG. 3 is a diagram showing an example of a state of a light curtain when an obstacle exists on a screen.
Figure 8:
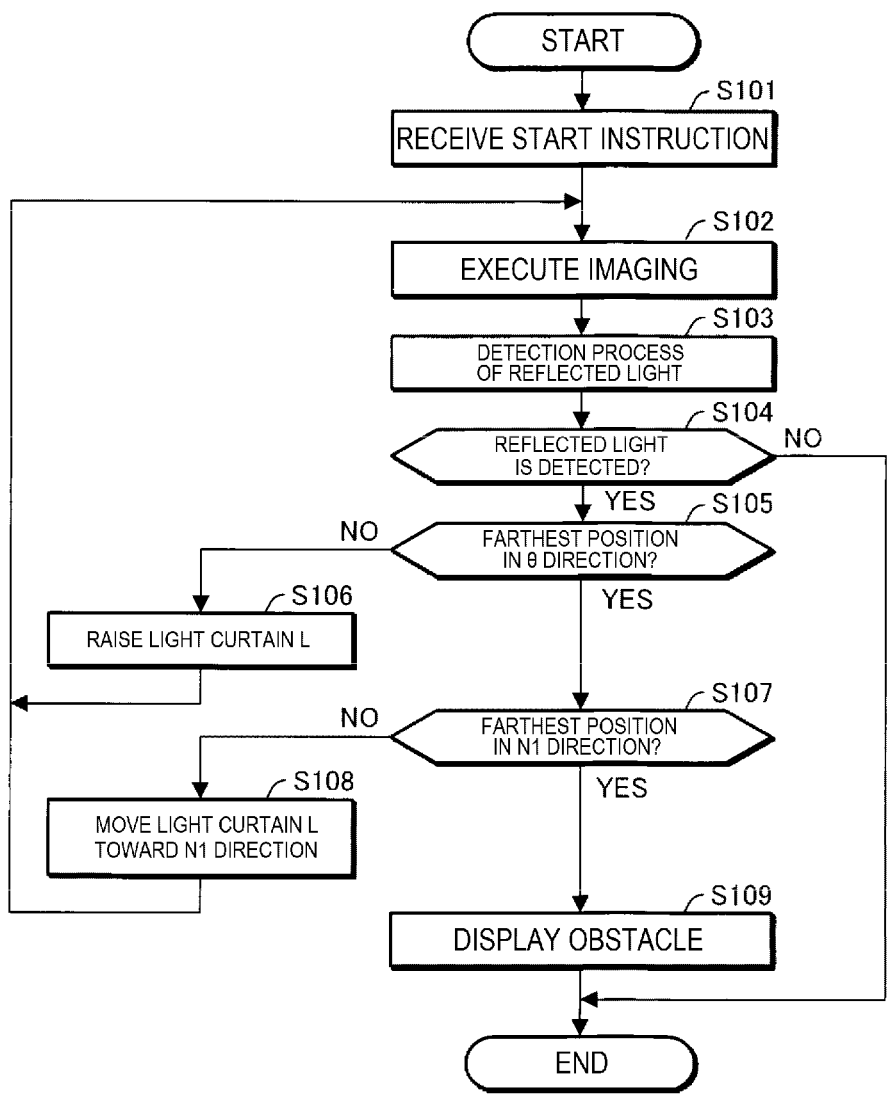
FIG. 8 is a flowchart for explaining a detection operation for the obstacle.

FIG. 3 is a diagram showing an example of a state of the light curtain L when the obstacle D exists on a screen SC. It should be noted that a side view of the display device 1 from the direction of the arrow P shown in FIG. 3 is shown in FIG. 8 described later.

As shown in FIG. 3, when the obstacle D on the screen SC blocks a part of the light curtain L, for example, when the obstacle D is an object which reflects, refracts, or absorbs a part of the light curtain L, the light curtain L fails to reach a detection obstacle area DA behind the obstacle D, or the propagation state of the light curtain L changes in the detection obstacle area DA. Therefore, even when the pointing body Q is located in the detection obstacle area DA, it is not possible for the pointing body Q to reflect the light curtain L, and thus, it becomes unachievable for the projector 2 to detect the pointing body Q.

Therefore, when the obstacle D on the screen SC blocks a part of the light curtain L, the display device 1 shifts the emission position of the light curtain L from the display device 1 toward the N1 direction shown in FIG. 2. Therefore, it is possible for the light curtain L to pass above the obstacle D, and thus, the detection obstacle area DA can be prevented from occurring.

It should be noted that the direction in which the emission position of the light curtain L is shifted is not limited to the N1 direction, but is only required to be a direction including a component of the N1 direction.

The obstacle D is, for example, a dust attached to the screen SC, or a protrusion of the screen SC. It should be noted that the obstacle D shown in FIG. 3 is illustrative only, and the shape and the size of the obstacle D are not limited to the shape and the size shown in FIG. 3.

A3: Example of Display Device 1

Figure 4:
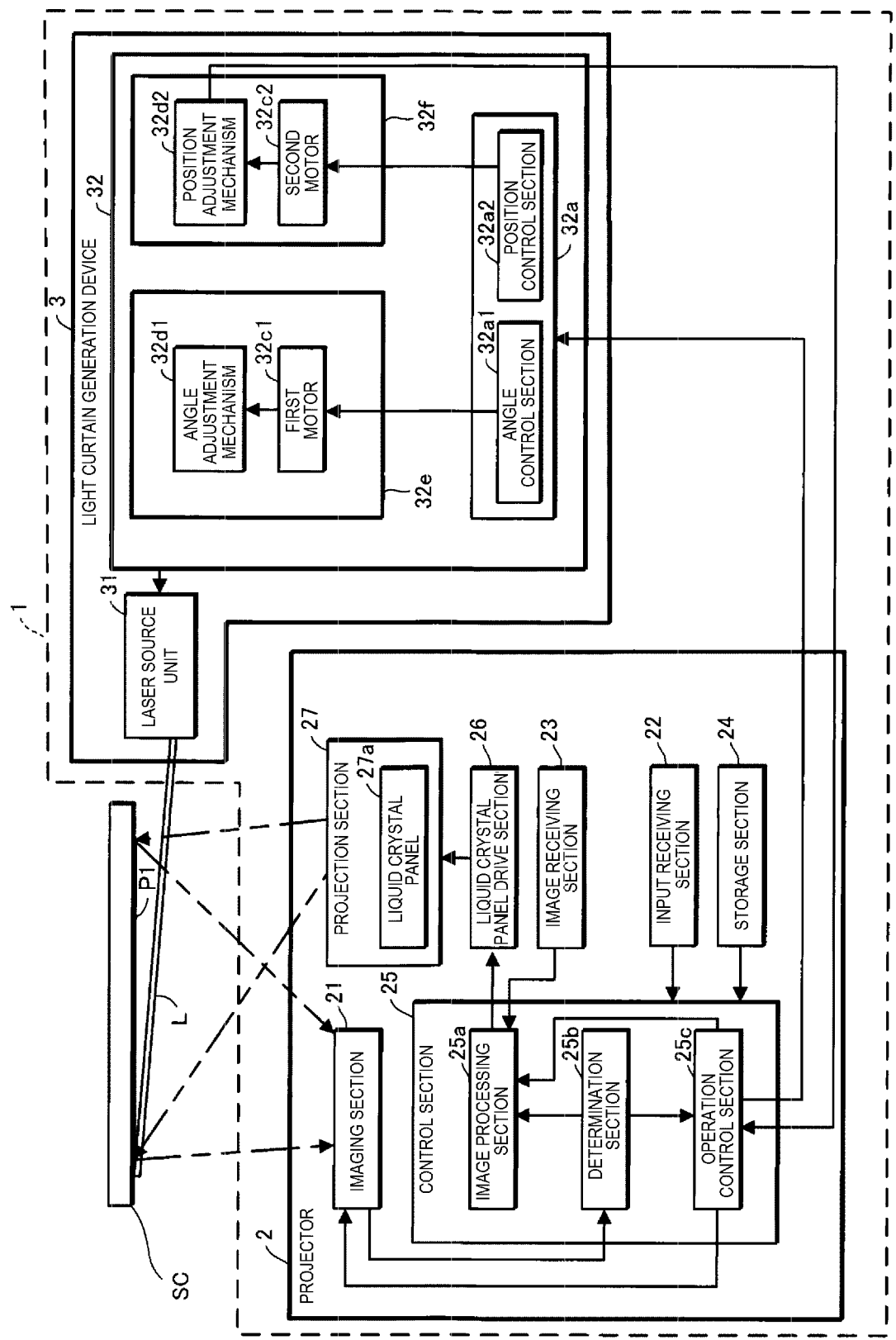
FIG. 4 is a diagram showing a projector including an imaging section, and a light curtain generation device.

FIG. 4 is a diagram showing the projector 2 including the imaging section 21, and the light curtain generation device 3.

The projector 2 includes an input receiving section 22, an image receiving section 23, a storage section 24, a control section 25, a liquid crystal panel drive section 26, and a projection section 27 in addition to the imaging section 21. The light curtain generation device 3 includes a laser source unit 31 for emitting the light curtain L, and an emission control section 32 for controlling the laser source unit 31. The emission control section 32 controls the emission angle of the light curtain L with respect to the screen SC and the emission position of the light curtain L in the N1 direction. The emission control section 32 is an example of a moving section. The emission angle of the light curtain L with respect to the screen SC is hereinafter simply referred to as the "emission angle of the light curtain L."

The emission position of the light curtain L in the N1 direction is simply referred to as the "emission position of the light curtain L."

The input receiving section 22 includes, for example, a variety of operation buttons, operation keys, or a touch panel for receiving input and so on from the user. The input receiving section 22 can also be a remote controller for transmitting information input from the user to the projector 2 wirelessly or with wire. In this case, the projector 2 is provided with a receiver section for receiving the information transmitted by the remote controller. The remote controller is provided with a variety of operation buttons, operation keys, or a touch panel for receiving the input from the user.

The image receiving section 23 receives an image signal representing an image via, for example, an image input terminal. The image receiving section 23 outputs the image signal to the control section 25.

The storage section 24 is a computer-readable recording medium. The storage section 24 is provided with, for example, a RAM (Random Access Memory), a ROM (Read Only Memory), and an EEPROM (Electrically Erasable Programmable Read Only Memory). The storage section 24 stores a variety of types of information and programs to be processed by the control section 25.

The control section 25 is formed of, for example, a single processor or a plurality of processors. Citing an example, the control section 25 is formed of a single CPU (Central Processing Unit) or a plurality of CPUs. Some or all of the functions of the control section 25 can also be configured by a circuit such as a DSP (Digital Signal Processor), an ASIC (Application Specific Integrated Circuit), a PLD (Programmable Logic Device), or an FPGA (Field Programmable Gate Array). The control section 25 executes a plurality of types of processing in parallel or in sequence.

The control section 25 retrieves the program from the storage section 24 and then executes the program to thereby realize an image processing section 25a, a determination section 25b, and an operation control section 25c. All or some of the image processing section 25a, the determination section 25b, and the operation control section 25c can be formed of hardware such as an FPGA.

The image processing section 25a performs image processing on the image signal received from the image receiving section 23 to thereby generate image information.

The image processing executed by the image processing section 25a includes, for example, a geometric correction process for correcting a keystone distortion of the image to be projected by the projection section 27. The image processing to be executed by the image processing section 25a can be image processing which does not include the geometric correction process. For example, the image processing to be executed by the image processing section 25a can include a gamma correction process without including the geometric correction process. Further, the image processing to be executed by the image processing section 25a can include the geometric correction process and the gamma correction process.

The liquid crystal panel drive section 26 applies a drive voltage corresponding to the image information input from the image processing section 25a to each pixel of a liquid crystal panel 27a.

The projection section 27 projects the projection image P1 on the screen SC to thereby display the projection image P1 on the screen SC. The projection section 27 is an example of a display section. Here, the display section does not include the screen SC.

The projection section 27 includes a light source not shown and a reflector not shown for reflecting light emitted by the light source toward the liquid crystal panel 27a. The light source is, for example, a discharge type light source lamp formed of a super-high pressure mercury lamp, a metal halide lamp, or the like. The light source is not limited to the lamp, but can also be an LED (Light Emitting Diode) light source, a laser source, or the like.

The liquid crystal panel 27a is an example of a light modulation device. Each pixel of the liquid crystal panel 27a modulates the light reflected by the reflector in accordance with the drive voltage applied by the liquid crystal panel drive section 26 to thereby generate light representing the image corresponding to the image information.

The projection section 27 projects the image light generated by the liquid crystal panel 27a on the screen SC through a projection lens not shown as the projection image P1. The light source is, for example, a discharge type light source lamp formed of a super-high pressure mercury lamp, a metal halide lamp, or the like. The light source is not limited to the lamp, but can also be the LED light source, the laser source, or the like. The projection image P1 is taken by, for example, the imaging section 21.

The determination section 25b receives imaging data generated by the imaging section 21. The imaging data represents the reflected light reflected by an object such as the pointing body Q or the obstacle D out of the light curtain L. The determination section 25b detects the reflection position of the light curtain L based on the imaging data. Further, the determination section 25b determines whether the obstacle D blocking at least a part of the light curtain L exists or not based on the imaging data.

The operation control section 25c controls the emission control section 32 based on a detection result by the determination section 25b. Specifically, when the determination section 25b determines that the obstacle D exists, the operation control section 25c controls the emission control section 32 to thereby make a distance between the screen SC and the laser source unit 31 in the N1 direction longer than a distance in the N1 direction between the screen SC and the laser source unit 31 at the moment of the determination that the obstacle D exists.

The operation control section 25c controls the emission control section 32 using a control signal S.

The control signal S is a signal for controlling rotations of motors included in the emission control section 32, specifically, a first motor 32c1 for adjusting the emission angle of the light curtain L, and a second motor 32c2 for adjusting the emission position of the light curtain L. Specifically, the control signal S represents the number of rotations and the rotational direction of the first motor 32c1, and the number of rotations and the rotational direction of the second motor 32c2. The operation control section 25c stores the history of the control signal S in the storage section 24.

The laser source unit 31 is, for example, a unit having optical system members such as a collimator lens and a Powell lens attached to one LD (Laser Diode) or a plurality of LDs. The laser source unit 31 emits the light curtain L. The laser source unit 31 is an example of an emission section. The emission section is not limited to the laser source unit 31, but can also be a unit for emitting the light curtain L using, for example, an LED.

The emission control section 32 includes a motor control section 32a, an angle adjustment section 32e, and a position adjustment section 32f. The emission control section 32 moves the laser source unit 31.

The motor control section 32a includes an angle control section 32a1 for controlling the angle adjustment section 32e, and a position control section 32a2 for controlling the position adjustment section 32f.

The angle control section 32a1 controls the first motor 32c1 in accordance with the number of rotations and the rotational direction of the first motor 32c1 out of the information represented by the control signal S.

The position control section 32a2 controls the second motor 32c2 in accordance with the number of rotations and the rotational direction of the second motor 32c2 out of the information represented by the control signal S.

The angle adjustment section 32e adjusts the emission angle of the light curtain L. The angle adjustment section 32e includes the first motor 32c1 and an angle adjustment mechanism 32d1. The first motor 32c1 is a stepping motor.

The first angle adjustment mechanism 32d1 changes the angle with the screen SC of the light curtain L in accordance with the rotation of the first motor 32c1. Specifically, the angle adjustment mechanism 32d1 rotates the laser source unit 31 in an A1 direction and an A2 direction around a rotational axis A shown in FIG. 5 in accordance with the rotation of the first motor 32c1. The rotational axis A is in a direction along the arrow P shown in FIG. 1.

When the laser source unit 31 rotates around the rotational axis A, the emission direction of the light curtain L is changed in the ±θ directions shown in FIG. 2. Here, the +θ direction is a direction in which the light curtain L gets away from the screen SC, and the −θ direction is a direction in which the light curtain L comes closer to the screen SC.

The position adjustment section 32f adjusts the emission position of the light curtain L. The position adjustment section 32f includes the second motor 32c2 and a position adjustment mechanism 32d2. The second motor 32c2 is a stepping motor.

Figure 5:
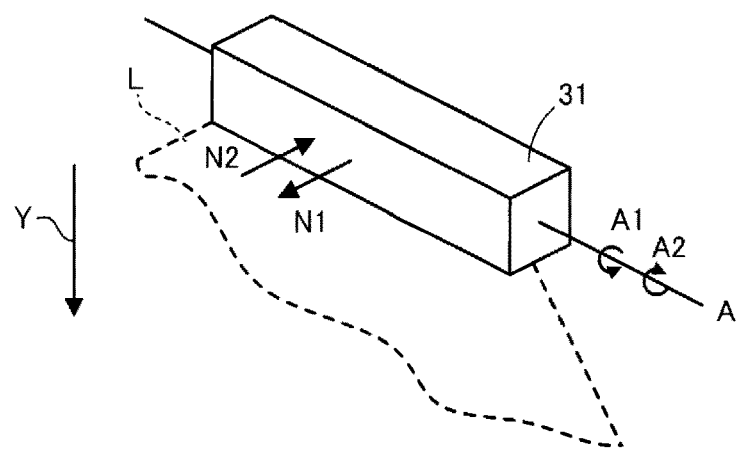
FIG. 5 is a diagram showing an example of a moving direction of a laser source unit.

The position adjustment mechanism 32d2 moves the emission position of the light curtain L toward the N1 direction shown in FIG. 5 or toward the N2 direction in accordance with the rotation of the second motor 32c2.

A4: Example of Position Adjustment Mechanism 32d2

Figure 6:
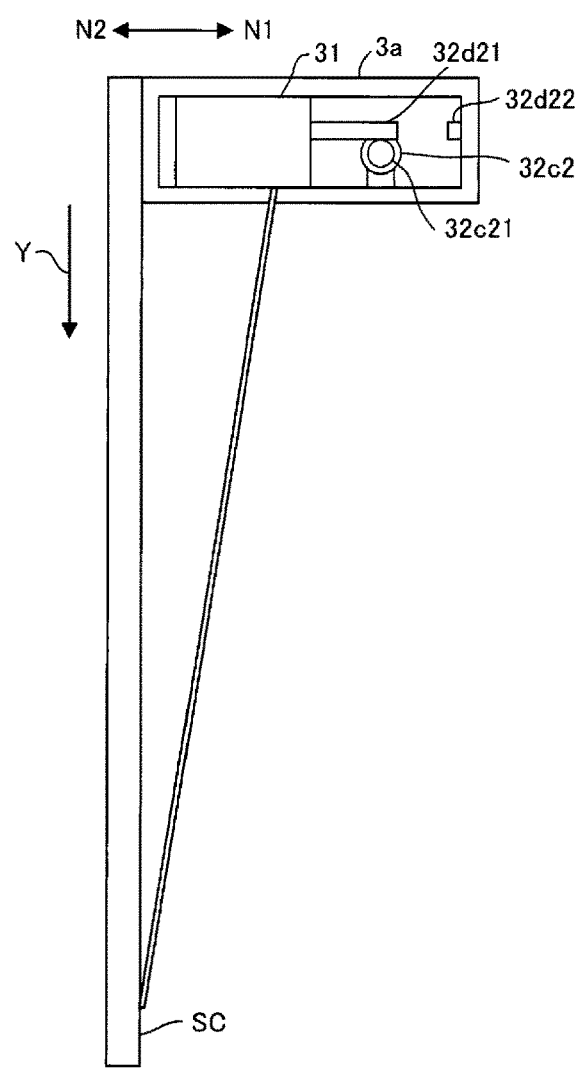
FIG. 6 is a diagram showing an example of a position adjustment mechanism.
Figure 7:
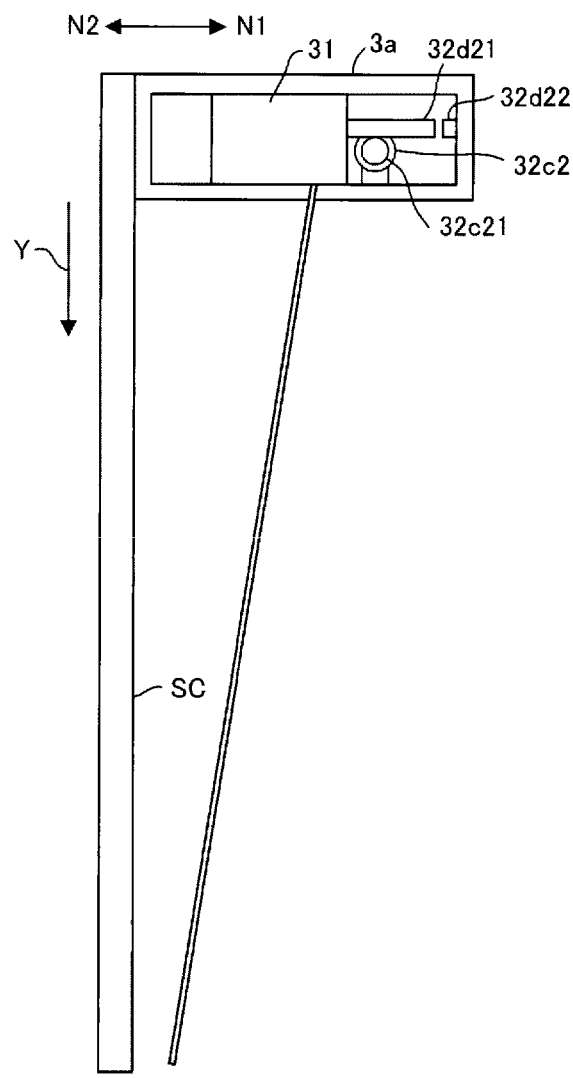
FIG. 7 is a diagram showing an example of the position adjustment mechanism.

FIG. 6 and FIG. 7 are each a diagram showing an example of the position adjustment mechanism 32d2. The light curtain generation device 3 has a housing 3a for housing the laser source unit 31 and the emission control section 32. The housing 3a is installed so as to be fixed with respect to the screen SC. In FIG. 6, the screen SC is a part of the wall, and the housing 3a is fixed to an upper part of the wall above the screen SC with screws or the like. A part of a lower end of the laser source unit 31 corresponds to the emission position of the light curtain L. The position adjustment mechanism 32d2 includes a rack 32d21 fixed to the laser source unit 31, and a switch 32d22 which turns ON when having contact with the rack 32d21. To the second motor 32c2, there is fixed a gear wheel 32c21. In a surface of the rack 32d21, on a surface opposed to the gear wheel 32c21, there is disposed a rack gear meshing with the gear wheel 32c21. The laser source unit 31 moves toward the N1 direction or moves toward the N2 direction in the housing 3a of the light curtain generation device 3 in accordance with the rotation of the second motor 32c2, more specifically, a rotation of the gear wheel 32c21. In other words, it is possible to shift the emission position of the light curtain L toward the N1 direction or the N2 direction. FIG. 6 shows when making the emission position of the light curtain L come closer to the screen SC, and FIG. 7 shows when making the emission position of the light curtain L get away from the screen SC without changing the emission angle of the light curtain L from that shown in FIG. 6.

It should be noted that the position adjustment mechanism 32d2 is not limited to the configuration shown in FIG. 6 and FIG. 7. For example, it is possible for the position adjustment mechanism 32d2 to move only the optical system members such as the collimator lens and the Powell lens out of the laser source unit 31 toward the N1 direction or the N2 direction in accordance with the rotation of the second motor 32c2.

A5: Operation Example

FIG. 8 is a flowchart for explaining a detection operation for the obstacle D. Hereinafter, it is assumed that the light curtain L is set at the position shown in FIG. 2. Further, it is assumed that the pointing body Q is not located on the screen SC.

The maximum displacement position toward the +θ direction of the light curtain L is hereinafter referred to as the "farthest position in the θ direction." Moving the light curtain L toward the +θ direction is referred to as "raising the light curtain L." The maximum displacement position toward the N1 direction of the laser source unit 31 is referred to as the "farthest position in the N1 direction." When the laser source unit 31 is located at the farthest position in the N1 direction, the switch 32d22 has contact with the rack 32d21 to turn to the ON state.

When the input receiving section 22 receives a start instruction representing a start of the detection of the obstacle D in the step S101, the operation control section 25c outputs an imaging instruction to the imaging section 21.

Subsequently, in the step S102, the imaging section 21 executes imaging of the screen SC in accordance with the imaging instruction. The imaging section 21 outputs the imaging data generated by imaging to the determination section 25b.

Subsequently, in the step S103, the determination section 25b executes a detection process of the reflected light on the imaging data.

Figure 9:
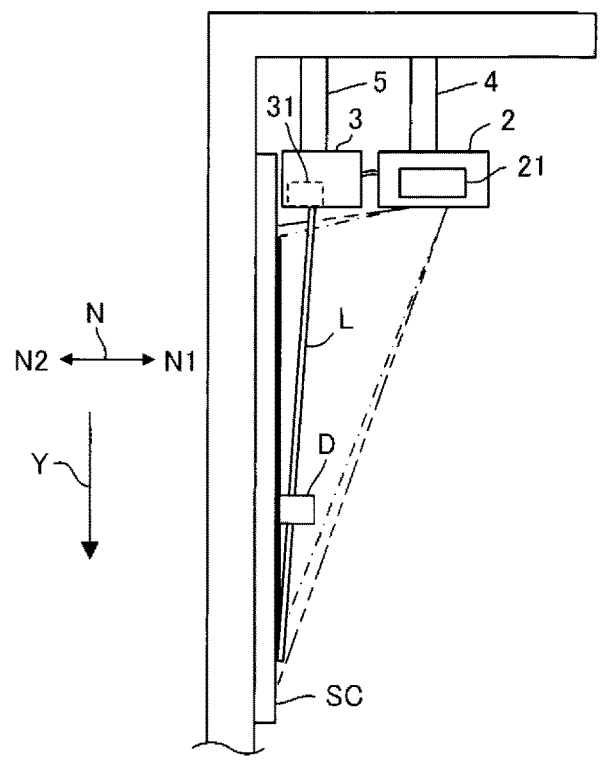
FIG. 9 is a diagram showing an example of a situation in which the obstacle exists.

Here, when the obstacle D exists as shown in FIG. 9, the reflected light reflected by the obstacle D out of the light curtain L is represented in the imaging data.

When the imaging data represents the reflected light, the determination section 25b determines in the step S104 that the reflected light exists.

When the determination section 25b determines that the reflected light exists, the operation control section 25c determines in the step S105 whether or not the light curtain L is located at the farthest position in the θ direction.

For example, the operation control section 25c determines whether or not the light curtain L is located at the farthest position in the θ direction based on the history of the control signal S stored in the storage section 24, more specifically, the history of the control signal S having already been output for driving the first motor 32c1.

Citing an example, when the history of the control signal S having already been output for driving the first motor 32c1 represents the number of rotations and the rotational direction of the first motor 32c1 necessary to locate the light curtain L at the farthest position in the θ direction, the operation control section 25c determines that the light curtain L is located at the farthest position in the θ direction. It should be noted that the number of rotations and the rotational direction of the first motor necessary to locate the light curtain L at the farthest position in the θ direction are, for example, stored in the storage section 24 in advance.

In contrast, when the history of the control signal S having already been output for driving the first motor 32c1 does not represent the number of rotations and the rotational direction of the first motor 32c1 necessary to locate the light curtain L at the farthest position in the θ direction, the operation control section 25c determines that the light curtain L is not located at the farthest position in the θ direction.

When the light curtain L is not located at the farthest position in the θ direction in the step S105, the operation control section 25c controls the angle adjustment section 32e using the control signal S to thereby raise the light curtain L in the +θ direction as much as a predetermined angle in the step S106. The predetermined angle is, for example, 0.5°. The predetermined angle is not limited to 0.5°, and can be larger or smaller than 0.5°. The smaller the predetermined angle is, the more finely the emission angle of the light curtain L can be adjusted. Subsequently, the process returns to the step S102.

Figure 10:
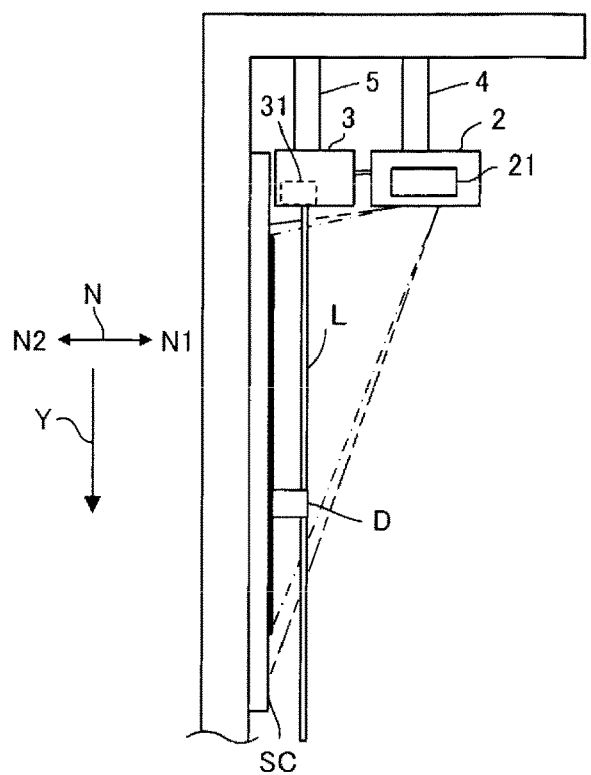
FIG. 10 is a diagram showing another example of the situation in which the obstacle exists.

In contrast, when the light curtain L is located at the farthest position in the θ direction as shown in FIG. 10 in the step S105, namely when at least a part of the light curtain L is reflected by the obstacle D even when the light curtain L is located at the farthest position in the θ direction, the operation control section 25c determines in the step S107 whether or not the laser source unit 31 is located at the farthest position in the N1 direction.

For example, when the switch 32d22 is in the ON state, the operation control section 25c determines that the laser source unit 31 is located at the farthest position in the N1 direction. When the switch 32d22 is in an OFF state, the operation control section 25c determines that the laser source unit 31 is not located at the farthest position in the N1 direction.

It should be noted that it is also possible for the operation control section 25c to determine whether or not the laser source unit 31 is located at the farthest position in the N1 direction based on the history of the control signal S, more specifically, the history of the control signal S having already been output for driving the second motor 32c2.

For example, when the history of the control signal S having already been output for driving the second motor 32c2 represents the number of rotations and the rotational direction of the second motor 32c2 necessary to locate the laser source unit 31 at the farthest position in the N1 direction, the operation control section 25c determines that the laser source unit 31 is located at the farthest position in the N1 direction. It should be noted that the number of rotations and the rotational direction of the second motor 32c2 necessary to locate the laser source unit 31 at the farthest position in the N1 direction are, for example, stored in the storage section 24 in advance.

In contrast, when the history of the control signal S having already been output for driving the second motor 32c2 does not represent the number of rotations and the rotational direction of the second motor 32c2 necessary to locate the laser source unit 31 at the farthest position in the N1 direction, the operation control section 25c determines that the laser source unit 31 is not located at the farthest position in the N1 direction.

When the laser source unit 31 is not located at the farthest position in the N1 direction in the step S107, the operation control section 25c controls the position adjustment section 32f using the control signal S to thereby move the laser source unit 31 toward the N1 direction as much as a predetermined distance in the step S108. Subsequently, the process returns to the step S102. The predetermined distance is, for example, 1 mm. The predetermined distance is not limited to 1 mm, and can be longer or shorter than 1 mm. The shorter the predetermined distance is, the more finely the emission position of the light curtain L can be adjusted.

Figure 11:
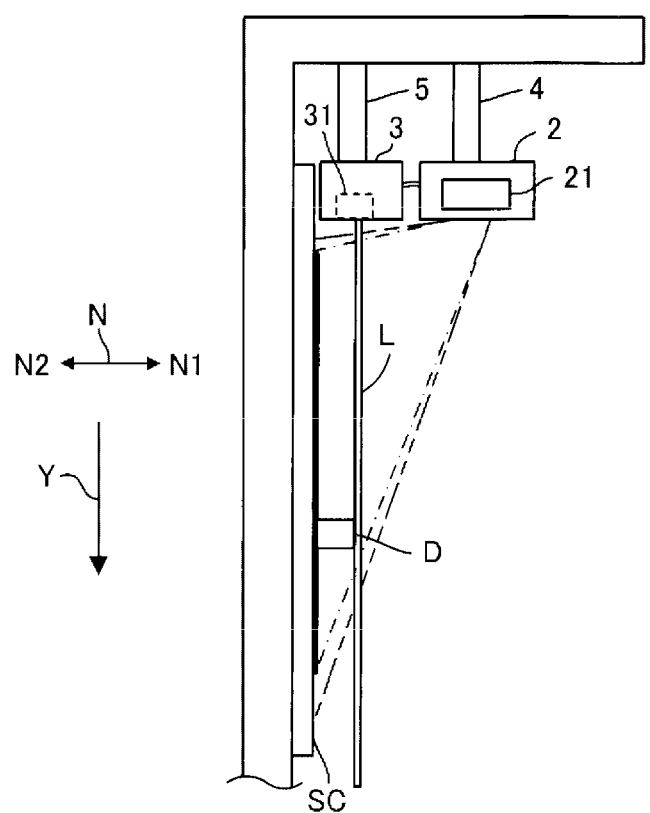
FIG. 11 is a diagram showing still another example of the situation in which the obstacle exists.

When the light curtain L stops to be shined on the obstacle D as shown in FIG. 11 due to the displacement toward the N1 direction of the laser source unit 31, the light curtain L stops to be reflected by the obstacle D. Therefore, the imaging data generated due to imaging in the step S102 stops representing the reflected light of the light curtain L by the obstacle D. Therefore, in the step S104, the determination section 25b determines that the reflected light does not exist, and the process shown in FIG. 7 is terminated.

In contrast, when the laser source unit 31 is located at the farthest position in the N1 direction in the step S107, namely when at least a part of the light curtain L is reflected by the obstacle D even when the laser source unit 31 exists at the farthest position in the N1 direction, the operation control section 25c outputs an image signal of an obstacle-existence image representing the existence of the obstacle to the image processing section 25a.

The obstacle-existence image is an image representing characters of, for example, "An obstacle seems to exist. Please check." The obstacle-existence image is not limited to the image described above, but can arbitrarily be changed. The operation control section 25c, for example, executes a program to thereby generate an image signal of the obstacle-existence image, and then outputs the image signal of the obstacle-existence image to the image processing section 25a. It should be noted that it is also possible that the image signal of the obstacle-existence image is stored in the storage section 24 in advance, and the operation control section 25c obtains the image signal of the obstacle-existence image from the storage section 24.

When the image processing section 25a receives the image signal of the obstacle-existence image, the image processing section 25a provides image information based on the image signal of the obstacle-existence image to the liquid crystal panel drive section 26. The liquid crystal panel drive section 26 drives the liquid crystal panel 27a based on the image information. Therefore, the projection section 27 displays the obstacle-existence image on the screen SC in the step S109.

Here, the imaging data generated by the imaging section 21 when the light curtain L is not located at the farthest position in the θ direction is an example of fourth imaging data.

The imaging data generated by the imaging section 21 when the light curtain L is located at the farthest position in the θ direction and the laser source unit 31 is not located at the farthest position in the N1 direction is an example of first imaging data, and an example of fifth imaging data.

The imaging data generated by the imaging section 21 when the light curtain L is located at the farthest position in the θ direction and the laser source unit 31 is located at the farthest position in the N1 direction is an example of sixth imaging data.

A6: Conclusion of First Embodiment

The method of operation of the display device 1 and the display device 1 according to the present embodiment described above include the following aspects.

The laser source unit 31 emits the light curtain L for detecting the pointing body Q for pointing the screen SC along the screen SC.

The emission control section 32 moves the laser source unit 31.

The determination section 25*b* determines whether the obstacle D exists or not based on the first imaging data generated by imaging the screen SC.

When the determination section 25*b* determines that the obstacle D exists, the operation control section 25*c* controls the emission control section 32 to thereby make the distance between the screen SC and the laser source unit 31 in the N1 direction longer than the distance between the screen SC and the laser source unit 31 in the N1 direction at the moment of the determination that the obstacle D exists.

According to this aspect, by moving the laser source unit 31 toward the N1 direction, it becomes possible to prevent the occurrence of the state in which the light curtain L is blocked by the obstacle D. Therefore, it is possible to prevent the detection of the pointing body Q using the light curtain L from being hindered by the obstacle D.

The determination section 25*b* determines whether the obstacle D exists or not based on the force imaging data generated by imaging the screen SC.

When the determination section 25*b* determines that the obstacle D exists based on the fourth imaging data, the operation control section 25*c* controls the emission control section 32 to thereby change the direction of the light curtain L to a direction in which the light curtain L gets away from the screen SC in the N1 direction.

The determination section 25*b* determines whether the obstacle D exists or not once again based on fifth imaging data generated by imaging the screen SC after changing the direction of the light curtain L.

When the determination section 25*b* determines that the obstacle D exists based on the fifth imaging data, the operation control section 25*c* controls the emission control section 32 to thereby move the laser source unit 31 to thereby make the distance between the screen SC and the laser source unit 31 in the N1 direction longer than the distance between the screen SC and the laser source unit 31 in the N1 direction at the moment of the determination that the obstacle D exists.

Therefore, when the light curtain L is blocked by the obstacle D even when the emission direction of the light curtain L has been changed, the laser source unit 31 is moved toward the N1 direction. Therefore, it is possible to reduce the frequency of moving the laser source unit 31 in the N1 direction in order to prevent the light curtain L from being blocked by the obstacle D.

The determination section 25*b* determines whether the obstacle D exists or not once again based on the sixth imaging data generated by imaging the screen SC after moving the laser source unit 31.

When the determination section 25*b* determines that the obstacle D exists based on the sixth imaging data, the operation control section 25*c* makes the projection section 27 display an image on the screen SC, the image representing the fact that the obstacle D exists.

Therefore, when the light curtain L is blocked by the obstacle D even when moving the laser source unit 31 in the N1 direction, it is possible to inform the user of the existence of the obstacle D. Therefore, it becomes easy for the user to be aware of the obstacle D, and the possibility for the user to remove the obstacle D increases.

It should be noted that when the reflection of the light curtain L by the obstacle D is resolved by moving the laser source unit 31 toward the N1 direction, it becomes possible to avoid the influence of the obstacle D without bothering the user.

B: Modified Examples

Some aspects of the modifications of the embodiment illustrated hereinabove will be illustrated blow. It is also possible to arbitrarily combine two or more aspects arbitrarily selected from the following illustrations with each other within a range in which the aspects do not conflict with each other.

B1: First Modified Example

In the embodiment described above, the adjustment of the emission position of the light curtain L is performed after the adjustment of the angle of the light curtain L. In contrast, it is also possible to perform the adjustment of the angle of the light curtain L after the adjustment of the emission position of the light curtain L. For example, the determination section 25*b* determines whether the obstacle D exists or not once again based on second imaging data generated by imaging the screen SC after moving the laser source unit 31. When the determination section 25*b* determines that the obstacle D exists based on the second imaging data, the direction of the light curtain L is changed to a direction in which the light curtain L gets away from the screen SC in the N1 direction. According to the first modified example, it is possible to reduce the frequency of the angle adjustment of the light curtain L.

In the first modified example, when the determination section 25*b* determines whether the obstacle D exists or not once again based on third imaging data generated by imaging the screen SC after changing the direction of the light curtain L, and the determination section 25*b* determines that the obstacle D exists based on the third imaging data, it is possible for the operation control section 25*c* to make the projection section 27 display the image on the screen SC, the image representing the fact that the obstacle D exists.

It should be noted that in the embodiment and the first modified example described above, the operation of adjusting the angle of the light curtain L can be omitted. Further, in the embodiment and the first modified example described above, the display of the image representing the fact that the obstacle D exists can be omitted.

B2: Second Modified Example

It is possible for the operation control section 25*c* to directly control the first motor 32*c*1 and the second motor 32*c*2.

B3: Third Modified Example

Two or more of the projector 2, the light curtain generation device 3, and the imaging section 21 can be integrated with each other to be formed of hardware.

B4: Fourth Modified Example

The wavelength band of the light curtain L can be a wavelength band of visible light and so on.

B5: Fifth Modified Example

A variety of types of actuator can be used instead of the first motor 32c1, and a variety of types of actuator can be used instead of the second motor 32c2.

B6: Sixth Modified Example

Although the liquid crystal panel 27a is used as an example of the light modulation device in the first embodiment and the first through fifth modified examples, the light modulation device is not limited to the liquid crystal panel, and can arbitrarily be changed. For example, it is also possible for the light modulation device to have a configuration using three reflective liquid crystal panels. Further, it is also possible for the light modulation device to have a configuration such as a system using three transmissive liquid crystal panels, a system using three digital mirror devices (DMD), or a system using a single digital mirror device. When using just one liquid crystal panel or DMD as the light modulation device, the members corresponding to the color separation optical system and the color combining optical system are unnecessary. Further, besides the liquid crystal panel or the DMD, any configurations capable of modulating the light emitted by the light source can be adopted as the light modulation device.

B7: Seventh Modified Example

In the first embodiment and the first through sixth modified examples, it is possible to use a display such as an FPD (Flat Panel Display) instead of the screen SC and the projector 2. It is possible to install the display surface of the FPD so as to stand vertically, and to install a detection device in an upper part of, or above the FPD. The FPD is, for example, a liquid crystal display, a plasma display, or an organic EL (Electro Luminescence) display. When the FPD is used instead of the projector 2, the FPD can be an FPD used for an electronic blackboard or an electronic conference system.

What is claimed is:

1. An operation method to be executed by a display device including at least one light source configured to emit detection light used to detect a pointing body configured to point a display surface along the display surface, the operation method comprising:
    determining whether an obstacle blocking at least a part of the detection light exists or not based on first imaging data generated by imaging the display surface; and
    moving, when the obstacle is determined to exist, the at least one light source away from the display surface in a direction perpendicular to a surface of the display surface in order to increase a distance between the display surface and the at least one light source.

2. The operation method according to claim 1, further comprising:
    determining whether the obstacle exists or not once again based on second imaging data generated by imaging the display surface after the at least one light source is moved; and
    changing, when the obstacle is determined to exist based on the second imaging data, a direction of the detection light to a direction in which the detection light moves away from the display surface in the direction perpendicular to the surface of the display surface in order to increase a distance between the detection light and the display surface.

3. The operation method according to claim 2, further comprising:
    determining whether the obstacle exists or not once again based on third imaging data generated by imaging the display surface after the direction of the detection light is changed; and
    displaying an image representing that the obstacle exists on the display surface when the obstacle is determined to exist based on the third imaging data.

4. An operation method to be executed by a display device including at least one light source configured to emit detection light used to detect a pointing body configured to point on a display surface along the display surface, the operation method comprising:
    determining whether an obstacle blocking at least a part of the detection light exists or not based on first imaging data generated by imaging the display surface;
    changing, when the obstacle is determined to exist based on the first imaging data, the direction of the detection light to a direction in which the detection light moves away from the display surface in a direction perpendicular to a surface of the display surface in order to increase a distance between the detection light and the display surface,
    determining whether the obstacle exists or not once again based on second imaging data generated by imaging the display surface after the direction of the detection light is changed; and
    moving, when the obstacle is determined to exist based on the second imaging data, the at least one light source away from the display surface in the direction perpendicular to the surface of the display surface in order to in order to increase a distance between the display surface and the at least one light source.

5. The operation method according to claim 4, further comprising:
    determining whether the obstacle exist or not once again based on third imaging data generated by imaging the display surface after the at least one light source is moved; and
    displaying an image representing that the obstacle exists on the display surface when the obstacle is determined to exist based on the third imaging data.

6. A display device comprising:
    at least one light source configured to emit detection light used to detect a pointing body configured to point a display surface along the display surface;
    a motor configured to move the at least one light source; and
    a processor that is configured to:
        determine whether an obstacle blocking at least a part of the detection light exists or not based on first imaging data generated by imaging the display surface; and
        control, when the processor determines that the obstacle exists, the motor in order to move the at least one light source away from the display surface in a direction perpendicular to a surface of the display surface in order to increase a distance between the display surface and the at least one light source.

* * * * *